Dec. 17, 1929.  R. E. FLATHERS  1,739,832
STEERING GEAR ATTACHMENT
Filed Sept. 30, 1927
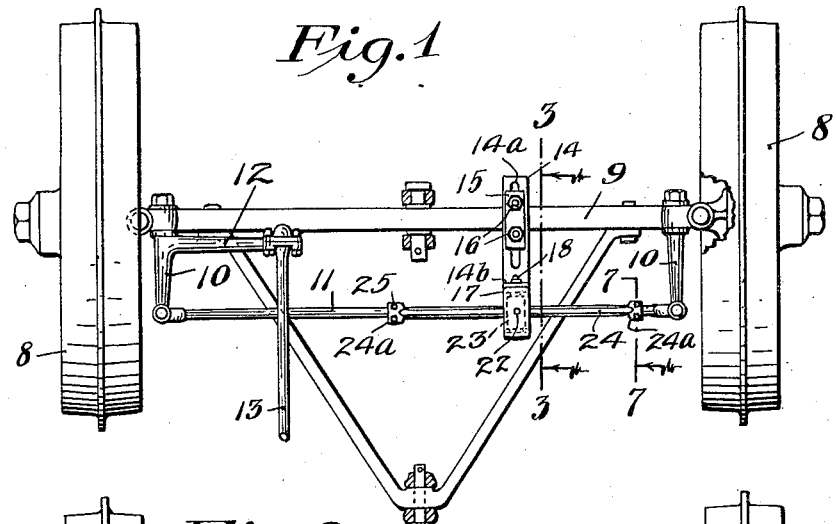
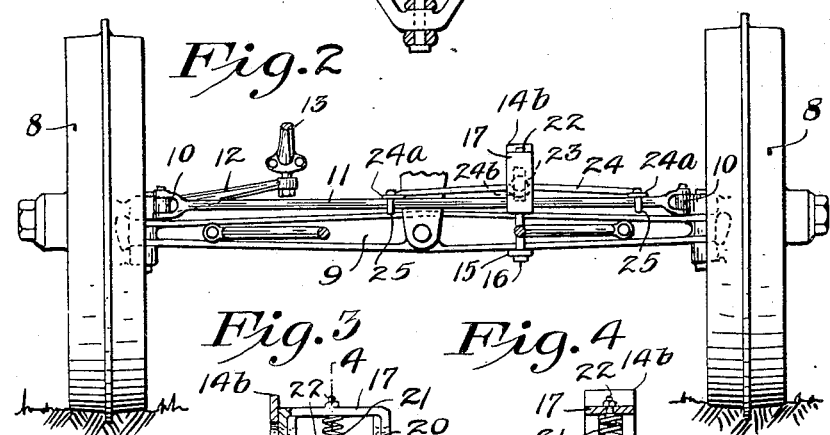
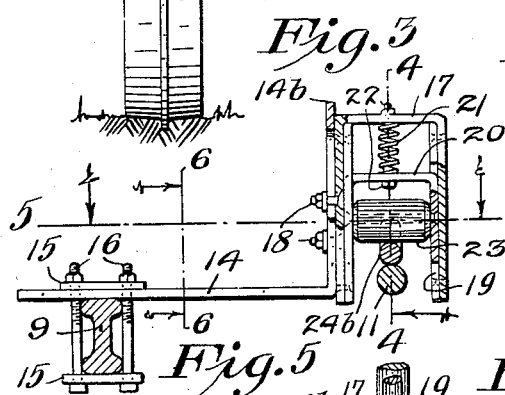
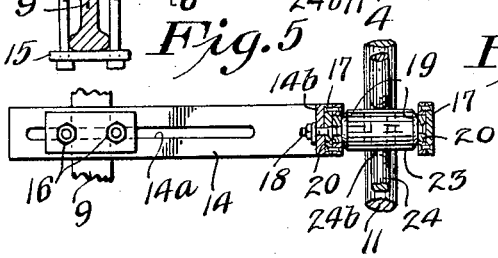
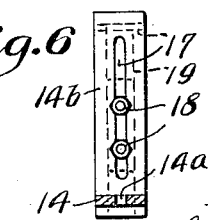
Inventor
Ronald E. Flathers
By his Attorneys
Williamson, Reel & Williamson Patented Dec. 17, 1929

1,739,832

UNITED STATES PATENT OFFICE

RONALD E. FLATHERS, OF IROQUOIS, SOUTH DAKOTA, ASSIGNOR TO ED FLATHERS, OF IROQUOIS, SOUTH DAKOTA

STEERING-GEAR ATTACHMENT

Application filed September 30, 1927. Serial No. 223,057.

This invention relates to attachments for the steering mechanism of tractors and other vehicles and especially to attachments which will hold the wheels in a desired position to cause the vehicle to maintain a certain course.

At the present time the driving and steering of tractors or other heavy vehicles for farm use is very laborious and fatiguing. Not only does the driver have to "fight the steering wheel" all day but practically his entire attention must be given to the steering of the vehicle in order that the same may move through the desired course or follow the line.

It is the main object of my invention to provide an extremely simple but highly efficient steering attachment for vehicles and tractors capable of universal application and adapted to cause the vehicle to maintain a desired course without requiring the attention of the driver.

It is a further object to provide a self-steering attachment for tractors and other vehicles which will not interfere in any way with the normal steering function of the wheels, but which will releasably hold the wheels in a desired position.

More specifically it is an object of the invention to provide apparatus of the class above referred to adapted to co-operate with elements for the steering mechanism and frame of the tractor or vehicle to accomplish the desired results.

These and other objects and advantages of the invention will be apparent from the following description made in connection with the accompanying drawings wherein like reference characters refer to similar parts throughout the several views, and in which:

Fig. 1 is a plan view of the front portion of a tractor frame showing the front wheels and part of the steering mechanism with an embodiment of my invention applied thereto;

Fig. 2 is a front elevation of the same;

Fig. 3 is a vertical section taken on the line 3—3 of Fig. 1, with some parts broken away;

Fig. 4 is a vertical section taken on the line 4—4 of Fig. 3;

Fig. 5 is a horizontal section taken on the line 5—5 of Fig. 3;

Fig. 6 is a vertical section taken on the line 6—6 of Fig. 3, showing the vertical adjustment of the frame of one of my retaining elements; and Fig. 7 is a vertical section taken on the line 7—7 of Fig. 1, showing one of the attachment means for another of my retaining members.

In the drawings, the forward or steering wheels 8 are shown pivotally connected by the usual spindle construction to the stationary front axle 9. The usual spindle arms 10 are connected by means of a connecting rod 11, and one of said spindle arms rigidly carries the steering arm 12 having its outer end connected with the usual drag link 13. It will be noticed that the connecting link 11 for the spindle arms extends a short distance to the rear of and substantially parallel with the front axle 9 of the tractor.

My attachment includs a rearwardly projecting bracket 14 rigidly secured to front axle 9. Bracket 14 may comprise an L-shaped bar having a horizontal attachment portion provided with a longitudinal slot 14ª and having a substantially vertical supporting portion 14ᵇ adapted to carry an adjustable interlocking device. Bracket 14 may be attached to the axle 9 in any suitable manner and as shown is provided with a pair of clamping plates 15 disposed below axle 9 and above the horizontal portion of bracket 14 respectively, said clamps being clamped together by means of heavy bolts 16. Obviously, bracket 14 is capable of considerable adjustment with respect to axle 9. An inverted U-shaped member 17 is adjustably secured to the vertical portion 14ᵇ of my bracket, suitable nutted bolts 18 being provided carried by one leg of said U-shaped member and passing through a vertical slot in the vertical portion 14ᵇ of the bracket. The legs of member 17 are provided on their inner sides with oppositely alined vertical grooves 19 in which a relatively small inverted U-shaped frame 20 is adapted to be slidably disposed. A coiled spring 21 is disposed between the base or horizontal portion of frame 20 and the base or horizontal portion of U-shaped member 17, suitable studs or seats 22 being provided for holding said spring in place. A roller 23 is trunnioned in the sides of frame 20 having its axis disposed substantially horizontal and perpendicular to axle 9.

Roller 23 yieldingly mounted within the U-member 17 is adapted to co-operate with a retaining member mounted on the connecting rod 11 to releasably hold the wheels 8 in a desired position. As illustrated, a rod or elongated retaining member 24 may be provided terminating in flattened portions 24a and having a centrally disposed recess or inwardly bent portion 24b of substantially semi-cylindrical contour to fit roller 23. The flattened ends of rod 24 may be secured to the connecting rod 11 by any suitable means, such as the U-bolts 25 and will, of course, be mounted on the side of connecting rod 11 adjacent to said cylinder.

I prefer to bend or otherwise form rods 24 in such manner that it is slightly bowed from the ends to the central portion thereof, permitting roller 23 to fit the recess 24b at approximately the same height at which said cylinder will engage the rod 24 adjacent the extremites thereof.

Operation

The operation of my device will be probably obvious from the foregoing description, but may be briefly summarized as follows:

Usually it is desirable to set the device to maintain the front wheels in alinement with the rear wheels of the tractor or other vehicle. This may be done by rigidly securing rod 24 to connecting rod 11, precisely alining the wheels and then rigidly connecting bracket 14 with the front axle in position for the roller 23 to fit in recess 24b, as shown in Figs. 4 and 5. It will be obvious that the U-shaped supporting member 17 may be adjusted vertically with reference to the vertical portion 14b of the bracket 14, while bracket 14 may be adjusted horizontally by loosening bolts 16.

Assuming the co-operating retaining elements to be properly set it is only necessary to turn the steering wheel until roller 23 engages its seat or recess 24b in rod 24. This can be easily felt by the driver, since there will be a slight resisting action when the steering wheel is further turned. Engagement of cylinder 23 and rod 24 is sufficient to hold the wheels against turning action and the vehicle can be driven in a straight line without requiring any attention on the part of the driver. When it is desired to make a turn the steering wheel is operated in the normal fashion, requiring slight additional effort to release roller 23 from engagement with rod 24. It will be seen that the structure and mounting of frame 20 in co-operation with coiled spring 21 causes roller 23 to be yieldingly held against rod 24.

My device can, of course, be set to cause the tractor or other vehicle to travel through a curved path or in a circle, depending upon the position of the front wheels when the bracket 14 is set upon the axle.

The adjustability of the U-shaped supporting member 17 with reference to the bracket and the longitudinal adjustment of the bracket with reference to the axle permit my device to be installed on different types of tractors and vehicles without necessitating the reconstruction or alteration of any of the vehicle parts.

From the foregoing description it will be seen that I have invented an extremely simple but highly efficient device for releasably setting the front wheels of the tractor or other vehicle in a desired position, whereby the vehicle may be made to travel through a desired path without requiring the attention of the driver. The parts are few in number, can be manufactured at little cost, and considerable actual usage has shown the device to be efficient for the purposes intended.

It will, of course, be understood that various changes may be made in the form, details, arrangement and proportions of the parts without departing from the scope of the invention.

If desired the positions of the co-operating retaining parts may be reversed relatively to their supporting members, that is, bracket 14 can be mounted with the U-shaped supporting members 17 depending therefrom, while rod 24 may be mounted on the under side of the connecting rod 11, enabling roller 23 to engage its seat in rod 24. This mounting of the parts is better suited to some commercial types of vehicles and tractors now in use.

What is claimed is:

1. A steering attachment for motor vehicles comprising an arm adapted to be rigidly attached to a relatively stationary portion of the frame of a vehicle and terminating adjacent the connecting rod of the steering mechanism, a vertical guide rigidly carried at said end of said arm and open at its portion adjacent said connecting rod, a roller support slidably mounted in said guide, a roller journaled in said support, a retaining member adapted to be fixed to said connecting rod and extending longitudinally thereof, said retaining member having a seat or detent adapted to be engaged by said roller when the steering mechanism is moved to a predemined position, and means for yieldingly holding said roller against said retaining member.

2. In combination with the front axle and the connecting rod for the steering mechanism of a motor vehicle, a steering attachment comprising an arm rigdly secured to said front axle and terminating adjacent said connecting rod, a vertical guide rigidly carried by the end of said arm and extending substantially at right angles to said connecting rod, a roller support slidably mounted in said guide, said guide being open at its end adjacent said connecting rod, a retaining rod rigidly secured to said connecting rod and extending longitudinally thereof and having a concave seat adapted to be engaged by said roller when said steering mechanism is in a predetermined position and having inclined camming surfaces at the sides of said seat.

In testimony whereof I affix my signature.

RONALD E. FLATHERS.